J. JONES.
Axle-Skein.

No. 3,984.

Patented Apr. 1, 1845.

UNITED STATES PATENT OFFICE.

JAMES JONES, OF GALWAY, NEW YORK.

PIPE BOX OR SKEIN FOR CARRIAGE-AXLES.

Specification of Letters Patent No. 3,984, dated April 1, 1845.

*To all whom it may concern:*

Be it known that I, JAMES JONES, of Galway, Saratoga county, State of New York, have invented a new and useful Improvement in the Construction of Axletrees of Wheeled Carriages, which is described as follows, reference being had to the annexed drawings of the same, making part of this specification, of which—

Figure 1:
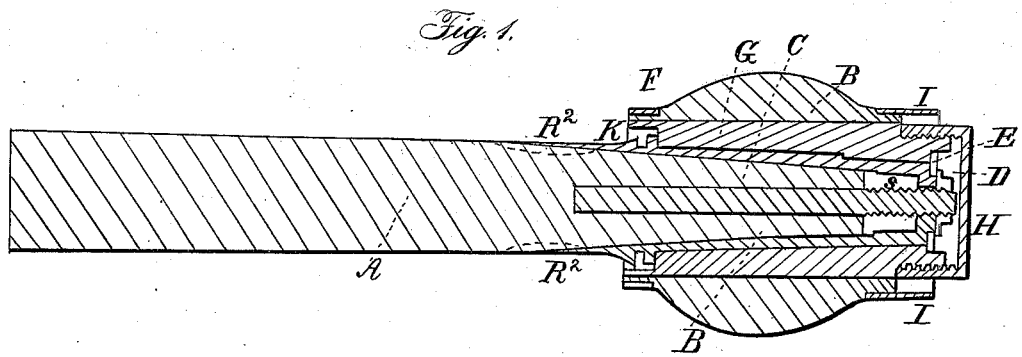
Figure 3:
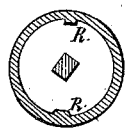
Figure 2:
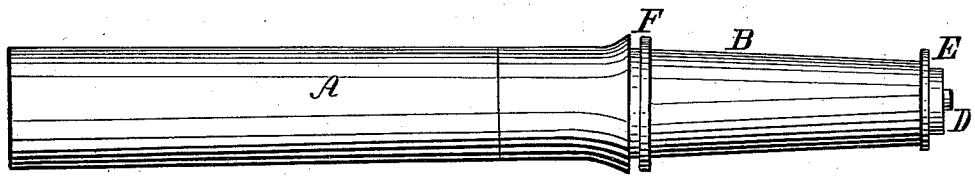

Figure 1 is a longitudinal section. Fig. 2 is a side elevation, and Fig. 3 is a cross section.

This improvement consists in giving to the axle-tree A a true taper from the shoulders to the smaller ends and covering them with adjustable skins B made in the form of hollow frustums of cones, of greater length than the tapered portions of the axle tree so as to have a space S between the end of the axle-tree and the end of the skein— the small end of the skein being closed except a circular space left in the middle through which is passed a screw rod C fixed permanently in the center of the axle tree. A square shoulder is formed on the small end of the skein to receive a washer E for securing the box $b$ on the skein by the nut D. On the inside of the skein at the large end are made several tapered ribs (represented by B in Fig. 3 and by the dotted lines at $R^2$ in Fig. 1) designed to fit corresponding grooves or channels made in the tapered portions of the axle tree, to prevent the skein turning on the axle tree— said ribs and grooves being so arranged in relation to each other that when the skein is turned on the axle-tree to compensate for any irregular wear of the skein the ribs will exactly fit into their corresponding grooves. A circular channel F is formed around the outside of the larger end of the skein to admit a safety pin or turning plate passing through the hub into said channel. This channel is covered by the end of the box G of the hub of the wheel, where said box is reamed out as at K to prevent the entrance of dust and dirt. The small ends of the box G is also reamed out to admit the washer E that secures the box to the skein. The outer end of the box G is formed with a male screw around its circumference corresponding with a female screw formed around the inside of a cylindrical cap H screwed to this end of the box to exclude dirt and give additional security to the fastening and to hold oil for lubricating the rubbing parts of the box and skein. The band I on the hub projects over this cap H in the usual manner.

The tapered portion of the axle-tree being made shorter than the inside length of the skein, as above stated, and without an abrupt or square shoulder at its greatest diameter, when the axle tree becomes smaller from shrinkage or other cause it is only necessary to turn the nut D and it again becomes tight the ribs effectually preventing it from turning on the axle-tree.

I do not claim to be the inventor of hollow skeins for axle-trees, for these have been heretofore used secured permanently to the axle trees by bolts or screws passing through them into the axle trees; but What I do claim as my invention and which I desire to secure by Letters Patent is—

The before described manner of fastening the skeins to the axle-tree so that they can be tightened and turned and changed in position whenever they become loose or uneven from the shrinking of the wood and the rubbing of the metallic surfaces, or from any other cause, by means of the aforesaid construction of the axle-tree and skeins, and arrangement of the screw rods and nuts and operated in the manner set forth.

JAMES JONES.

Witnesses:
EDWIN MAHER,
C. R. SOULE.